(No Model.) 2 Sheets—Sheet 1.
A. B. GALLOWAY.
BICYCLE RIDING SKIRT.
No. 541,435. Patented June 18, 1895.
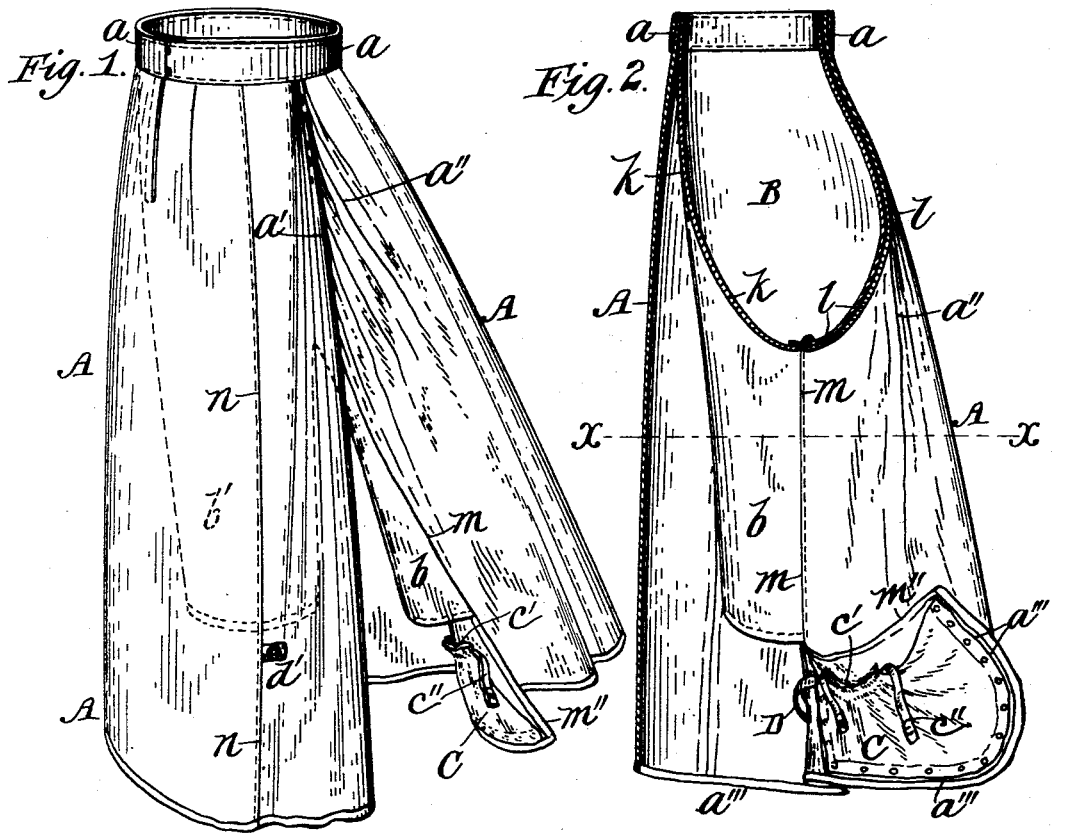
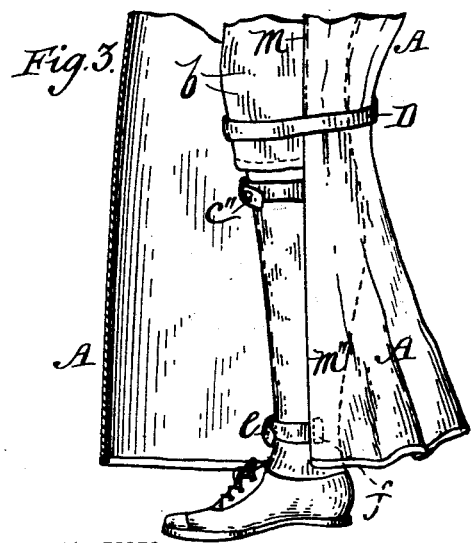
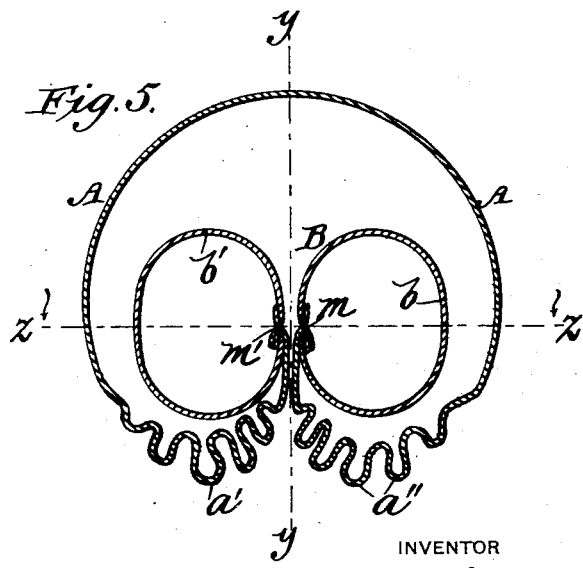
WITNESSES
INVENTOR
Abbie B. Galloway
By E. B. Clark
Atty.

(No Model.) 2 Sheets—Sheet 2.
A. B. GALLOWAY.
BICYCLE RIDING SKIRT.
No. 541,435. Patented June 18, 1895.
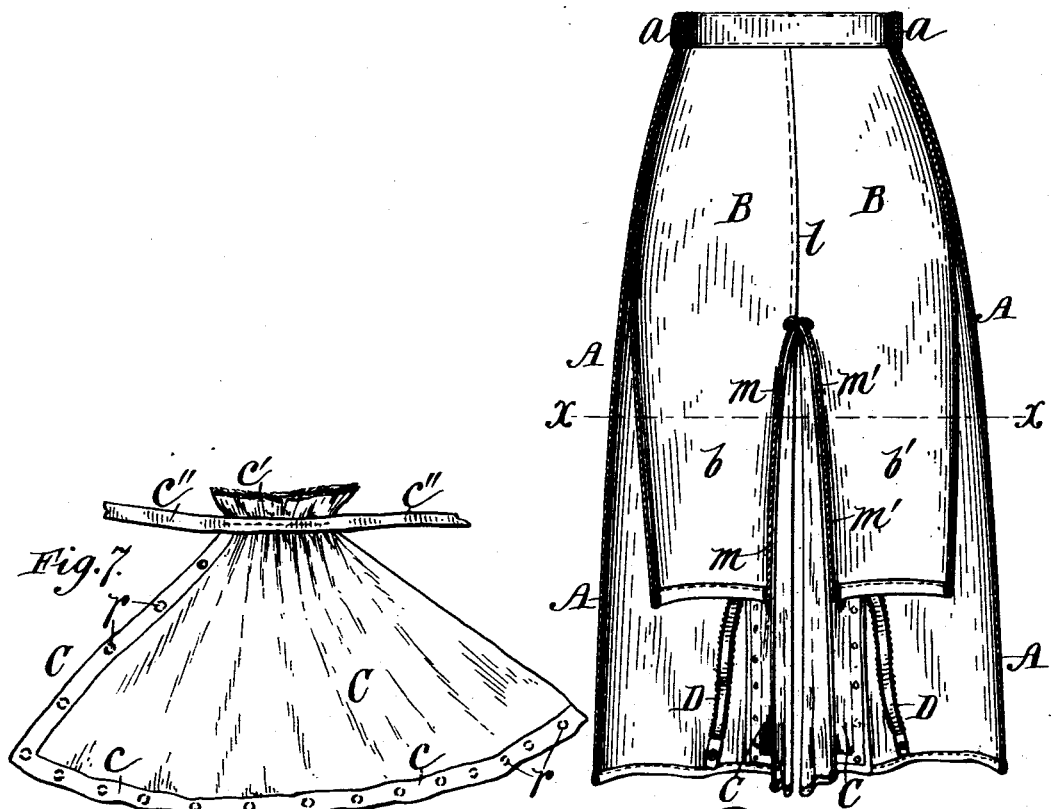
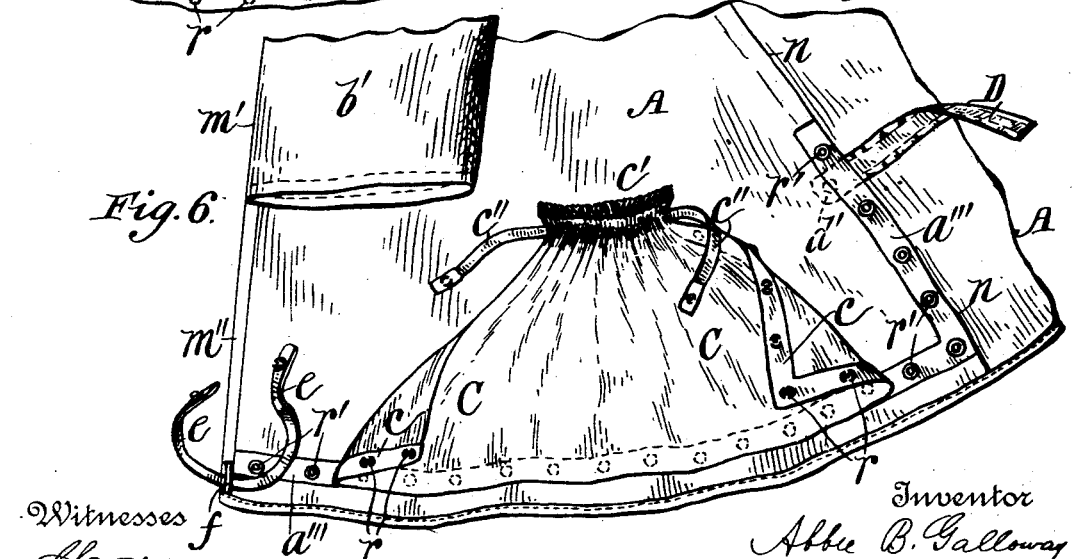
Witnesses
Severance
Harry D. Rohrer
Inventor
Abbie B. Galloway
By E. B. Clark
Attorney
THE NORRIS PETERS CO., PHOTO-LITHO., WASHINGTON, D. C.

UNITED STATES PATENT OFFICE.

ABBIE B. GALLOWAY, OF EAST SOMERVILLE, MASSACHUSETTS.

BICYCLE RIDING-SKIRT.

SPECIFICATION forming part of Letters Patent No. 541,435, dated June 18, 1895.

Application filed September 29, 1894. Serial No. 524,426. (No model.)

*To all whom it may concern:*

Be it known that I, ABBIE B. GALLOWAY, a citizen of the United States, residing at East Somerville, in the county of Middlesex and State of Massachusetts, have invented certain new and useful Improvements in Bicycle Riding-Habits; and I do hereby declare the following to be a full, clear, and exact description of the invention, such as will enable others skilled in the art to which it appertains to make and use the same.

My invention relates to ladies' riding habits, especially adapted for the use of females in riding bicycles, though it may be advantageously used for riding horseback.

The object of my invention is to provide a combination garment, consisting of a divided skirt and trousers, suitably connected together to form a convenient, and, at the same time, graceful riding habit, particularly adapted for use of female bicyclists, and for a walking skirt.

Another object of my invention is to provide a skirt and suitable attachments by means of which the rider's legs are concealed and protected, and by which the usual skirt-guard attached to ladies' bicycles may be done away with without danger of the skirt being caught in the spokes of the wheel, thereby reducing the weight of the machine.

One of the especial objects of my invention is to provide for drawing the fullness of the skirt from the inside and back of the leg toward the outside thereof and securely hold it in such position, so as to be away from the wheel and out of danger of being blown in between the spokes, so as to provide perfect freedom of movement of the legs and secure convenience and safety in the arrangement of the skirt. This object is accomplished by means of a detachable facing, narrow at the top and wide at the bottom, one side edge and the lower edge having fastening devices, and the skirt also having fastening devices at or near its lower edge, the said fastening devices along the side edge of the facing and on the side of the skirt being arranged to diverge from below upward, so that when the facing is connected by such devices, it will draw the skirt from the inside of the leg of the wearer toward the outside thereof for preventing interference with the wheel of the bicycle.

The facing is preferably made with a shirred or gathered upper edge and attached to a knee-band for securing it to the leg. This detachable facing is preferably attached to the skirt by means of snap-buttons, by means of which it may be quickly attached for use, while the rider is on a bicycle and can be quickly removed when the rider is dismounted and wishes to walk. An extra facing is secured to each side or part of the divided skirt, so as to provide one for each leg of the wearer. The facings being attached to the inside of the skirt, do not mar the outside thereof, but they effectively gather the skirt away from interference with the wheel and obviate the necessity of a special dress guard.

The improvement constituting my invention will be defined in the claims.

I will now particularly describe the details of my bicycle habit by reference to the accompanying drawings, in which—

Figure 1 represents a rear perspective view of the skirt partly opened at the back and revealing part of the trousers. Fig. 2 represents a vertical central section with the lower end of the skirt thrown back on the line $y$ $y$, Fig. 5. Fig. 3 represents a vertical section through the lower part of the skirt, showing the back part of it gathered around the right leg and ankle. Fig. 4 represents a vertical section through the skirt and trousers on lines $z$ $z$ and looking to the right in Fig. 5. Fig. 5 represents a horizontal section through the skirt and trousers on the line $x$ $x$, Figs. 1, 2, and 4. Fig. 6 represents an inside view of the lower end and back part of the skirt and trousers on one side of the garment. Fig. 7 represents a view of the extra detachable facing.

My bicycle habit is made with a plain gored skirt, A, divided at the back and joined at the top to a belt, $a$, and having the fullness formed into plaits $a'$ and $a''$, at the back, as shown in Figs. 1 and 5.

The trousers, B, may be connected to the top belt, $a$, as shown, or to a separate belt, and the back seam of the trousers is connected to the back seam of the skirt so as to form the seat seam, $l$. Shown in Figs. 2 and 4. The back edge or seam of the skirt is also united with the legs, $b$, $b'$, of the trousers at the leg seams, $m$, and $m'$, as shown in Figs.

2, 4, and 5. The free edge of the skirt, $m''$, extends down below the trousers legs on each side as shown in Figs. 1, 2 and 3, so as to form a full length skirt, giving the effect of an ordinary street skirt when the wearer is on foot. The trousers, B, are preferably made without the usual side seam and with only the front seam $k$, the seat seam $l$, and the two inner leg seams $m$ and $m'$. The plaits or folds, $a'$ and $a''$, forming the fullness of the skirt at the back, are important features of my bicycle habit, for the reason, that with them it will serve both as a riding and walking skirt. Sufficient fullness is thus given for conveniently gathering the free back edges $m''$, and the folds of the skirt around the ankle and leg, as indicated in Fig. 3, though in this figure the skirt is partly drawn back for showing the straps or bands and the trousers leg $b$. In practice, the skirt would still further envelop the leg. It should be observed that Fig. 3 represents an inside view of one side of the skirt and is for the purpose of showing part of the trousers, as well as the skirt, gathered into folds and held by suitable straps or bands.

The trousers may be made of the same fabric as the skirt, or of some lighter weight material, such as silk or sateen, while the skirt may be made of some woolen cloth, such as broadcloth, serge or velvet.

The back breadth of the skirt is provided at the lower edge with a strengthening band or strip, $a'''$, extending also up the side seams $n$, as shown in Figs. 2 and 6, for attachment of the shanks, $r'$, of the snap buttons, $r$, which are secured to the detachable facing C.

The strengthening strip need not necessarily extend up a side seam as $n$, but may extend up the side of the skirt in any suitable position for attaching thereto the detachable facing, and such strip may be entirely omitted if desired, and one part of the snap-buttons attached directly to the dress goods.

The detachable facing, C, is provided at its lower edge with a strengthening band, $c$, to which are secured the snap buttons, $r$; and the upper edge of said facing is preferably gathered or shirred, as shown at $c'$, and is attached to an elastic band, $c''$, having snap buttons secured to its ends, as shown in Figs. 2 and 6. In practice, the snap buttons, $r$, are preferably secured to the strengthening band, $c$, and then the outer surface is covered by the fabric forming the facing C, as indicated by dotted lines in Fig. 6.

The detachable facing, C, may be secured to the lower edge of the skirt and the side seams, $n$, or the side of the skirt in any other desired manner, but I have found that the snap buttons afford a convenient means for quickly attaching and detaching said facing. The facing, C, should be narrow at the top edge, as above stated, but need not be gathered in order to be within the limits of my invention. It is of more particular importance that the facing be nearly triangular in shape, as shown, and that the line of fastening devices along one edge be inclined or diagonal to the fastening devices on the lower edge thereof as shown, so that the fastening devices along said edge of the facing and the fastening devices on the side of the skirt shall diverge from below upward. By this arrangement the facing when attached at the bottom and along one edge draws the fullness of the skirt back from the inside around to the outside of the leg and ankle of the wearer, so as to be away from the wheel, while at the same time it allows perfect freedom of movement of the legs in working the pedals of the machine. The fullness of the skirt is so well drawn away from the inside of the leg and ankle, and also away from the wheel, and securely held at the outside of the leg by means of facing, C that no part of the skirt is liable to be blown by the wind between the spokes of the wheel. Perfect safety and freedom in riding are thus secured. The elastic band, $c''$, is, in practice, fastened around the leg just below the knee as shown in Fig. 3.

In order to still further gather the skirt in folds about the leg, an elastic band D, or an ordinary ribbon or leather strap is inserted through a slit in the side seam, $n$, and is provided at its end with a tab, $d'$, having secured to it the shank of a snap-button, while the other end of band D is provided with a snap-button $d$. The band D, thus arranged, may be passed around the leg and around the breadth of skirt between the side seam, $n$, and the back edge $m''$, so as to gather the skirt into folds, as shown in Fig. 3. This arrangement is desirable in windy weather and also when the user wishes to ride very fast, and prevents any part of the skirt from catching in the spokes of the wheel. A ribbon or leather strap, $e$, is attached by a loop, $f$, or other device, to the back edge, $m''$, at the bottom of the skirt, as shown in Figs. 3 and 6, for passing around the ankle. This ankle-band may be also provided with snap-buttons or with a buckle for securing it in place and thereby holding the lower edge of the skirt against the ankle.

When the habit is to be used by the wearer in riding a bicycle, the detachable facing, C, is secured in position by means of the snap-buttons and then the upper shirred edge, $c'$, is adjusted to the leg by means of the band, $c''$. The ankle-band or strap, $e$, is fastened around the ankle and the elastic band D, is secured around the leg, just above or below the knee, thereby gathering the skirt into folds, as shown in Fig. 3, or the band, D, may be left unfastened, if desired. When the rider dismounts and wishes to walk in the skirt, all the bands are disengaged and the detachable facings, C, may be quickly removed from the skirt and placed in a pocket or hand-bag. The habit will then present a neat and graceful appearance like any street costume. The extra fullness produced by the plaits in the back of the skirt completely hide the division in the skirt and conceals the back seam attached to the inner leg seam of the pants, so that the divided character of the skirt is not apparent.

I have found this bicycle habit very convenient and effective in practice, and it is now in extensive use by lady bicycle riders.

Having described my invention, what I claim, and desire to secure by Letters Patent, is—

1. A bicycle riding-habit comprising a skirt, divided at the back, and having plaits or gathers in the back, united to the top band and extending to the bottom of the skirt to form extra fullness, and trousers—the back edges of the skirt being attached to the seat seam and to the inner or leg seams of the trousers, and means for drawing the fullness of the skirt toward the outside of the leg of the wearer, so as to avoid interference with the wheel, substantially as described.

2. In combination with a skirt divided in the back, a facing gathered or shirred at the top and having a top band or strap, said facing being detachably secured at its lower edge at or near the bottom of the skirt, and at one of its side edges to the side thereof, whereby the skirt may be drawn away from the inside of the leg of the wearer and toward the outside thereof, to avoid interference with the wheel, substantially as described.

3. In a bicycle riding habit a skirt divided in the back, in combination with a facing, narrow at the top and wide at the bottom, said facing having fastening devices along its lower edge and along one of its side edges, the skirt having corresponding fastening devices at or near its bottom edge and at one side thereof, the fastening devices at the side of the skirt and on the side edge of the facing being arranged to diverge from below upward, whereby said facing may be readily attached to the skirt for drawing the latter away from the inside of the leg of the wearer and to the outside thereof, for preventing interference with the wheel of the bicycle, and whereby also the skirt may be readily adapted for a walking costume, substantially as described.

4. In combination with a skirt divided in the back, a detachable facing gathered at the top and having means for securing it to the leg of the wearer, and wide at its lower edge, one side edge and the lower edge having fastening devices, the skirt also having fastening devices at or near its lower edge and at the side,—the fastening devices on the edge of the facing and on the side of the skirt being arranged to diverge from below upward, and a strap or band arranged to pass around part of the divided skirt and leg of the wearer at the knee, whereby the skirt will be drawn away from the inside of the leg of the wearer and may be held at the outside thereof, substantially as described.

In testimony whereof I affix my signature in presence of two witnesses.

ABBIE B. GALLOWAY.

Witnesses:
C. H. KEACH.
F. DE WITT LAPHAM.